Feb. 9, 1960  R. F. MORTON  2,924,039
FISHING APPARATUS
Filed June 10, 1958
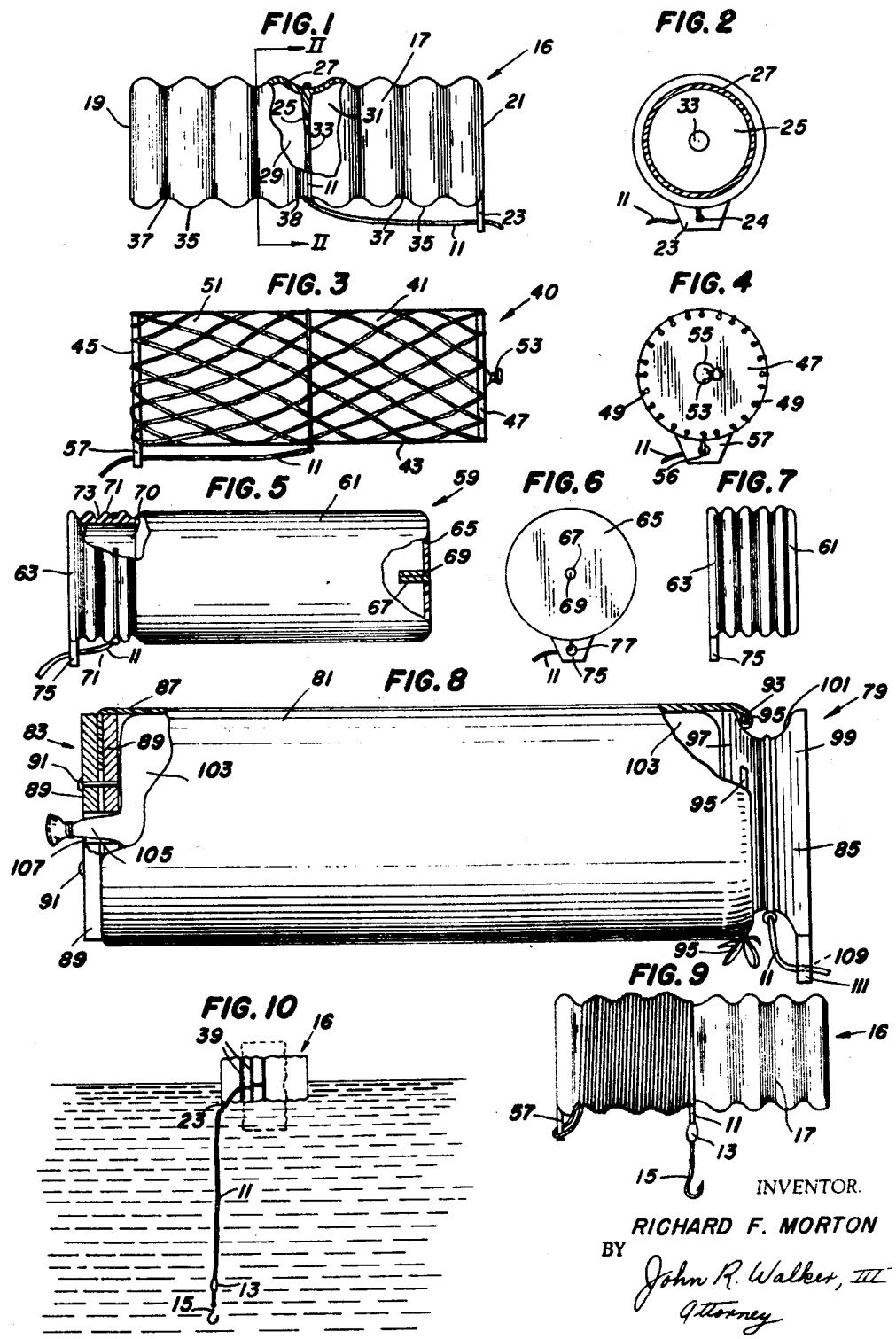
INVENTOR.
RICHARD F. MORTON
BY John R. Walker, III
Attorney

United States Patent Office 2,924,039
Patented Feb. 9, 1960

2,924,039

FISHING APPARATUS

Richard F. Morton, Whitehaven, Tenn.

Application June 10, 1958, Serial No. 744,629

3 Claims. (Cl. 43—43.11)

This invention relates to fishing apparatus and, more particularly, to apparatus adapted for "jug fishing," which is that type of fishing wherein a fishing line, provided with the usual hook and sinker, is attached to a float which is allowed to float free in the water. In "jug fishing" there are no poles used, as opposed to conventional fishing apparatus in which the fishing line is suspended from a fishing pole.

One of the objects of the present invention is to provide fishing apparatus for fishing without the aid of a pole.

A further object is to provide such fishing apparatus which is adapted to be easily and conveniently put into the water whereupon the fishing line unwinds to a disposition suitable for catching fish.

A further object is to provide such fishing apparatus which is light in weight, thereby being extremely buoyant and easy to transport.

A further object is to provide such fishing apparatus which is able to withstand long periods of use because of its non-susceptibility to rust, dents, or any other damage commonly expected to occur to fishing apparatus exposed to the elements and exposed to hazards such as floating logs found in rivers and lakes.

A further object is to provide such a fishing apparatus which can easily be seen, thereby minimizing the chance of the loss thereof.

A further object is to provide such an apparatus having means for indicating when a fish has been caught.

A further object is to provide such a fishing apparatus which is compact and convenient for carrying.

A further object is to provide means in the fishing apparatus for separating the fishing line while drying.

A further object is generally to improve the design and construction of fishing apparatus.

The means by which the foregoing and other objects of the present invention are accomplished and the manner of their accomplishment will be readily understood from the following specification upon reference to the accompanying drawings, in which:

Fig. 1 is a side elevational view of the float of the preferred embodiment of the present invention with a portion thereof being broken away for purposes of illustration and with a fragmentary portion of the fishing line being shown attached thereto.

Fig. 2 is a sectional view thereof taken as on the line II—II of Fig. 1.

Fig. 3 is a side elevational view of a modified embodiment of the float of the present invention with a fragmentary portion of the fishing line being shown attached thereto.

Fig. 4 is an end view of the device of Fig. 3.

Fig. 5 is a side elevational view of another modification of the float of the present invention with a portion thereof being broken away for purposes of illustration and with a fragmentary portion of the fishing line being shown attached thereto.

Fig. 6 is an end view of the device of Fig. 5.

Fig. 7 is a side elevational view of the device of Fig. 5 shown in a collapsed or carrying disposition.

Fig. 8 is a side elevational view on an enlarged scale of still another modification of the present invention with parts being broken away for purposes of illustration and with a fragmentary portion of the fishing line being shown attached thereto.

Fig. 9 is a side elevational view on a reduced scale of the preferred embodiment of the present invention shown in readiness for being tossed into the water.

Fig. 10 is a view on a further reduced scale of the apparatus of the present invention shown after the line has been unwound from the float thereof and the apparatus is in a disposition for catching fish and with the disposition of the float after a fish has been caught being shown in broken lines.

Referring now to the drawings in which the various parts are indicated by numerals, the fishing apparatus of the present invention includes, in general, a float, a fishing line 11 tied thereto, the usual weight or sinker 13, and the usual fish hook 15 attached to fishing line 11 adjacent the end thereof remote from said tied end.

The preferred embodiment of said float, designated in general as float 16 and which is illustrated in Figs. 1, 2, 9, and 10, comprises an elongated body member 17 of substantially cylindrical configuration and a pair of spaced circular end members 19, 21 attached adjacent opposite ends of body member 17 to form a water-tight float. A tab 23 having an aperture 24 is attached to body member 17 adjacent end member 21 and projects radially outwardly therefrom. Body member 17 is hollow and provided with a reinforcing partition 25 attached to the wall 27 of body member 17 and projecting radially inwardly therefrom to divide the body member into two chambers 29 and 31. A hole 33 is provided in reinforcing partition 25 whereby chambers 29 and 31 are communicated with one another to equalize the pressure therein.

Wall 27 is irregular in construction to provide a plurality of alternate ridges 35 and depressions 37 on the outer surface of body member 17. Ridges 35 and depressions 37 are disposed circumferentially of body member 17 and the alternate ridges and depressions preferably extend substantially along the entire length of the body member. The one of the depressions 37 which is adjacent the mid-portion of body member 17 is wider than the other depressions and will be hereinafter designated at notch 38, the purpose of which will become more apparent in the description to follow of the operation of the device.

Float 16 is preferably formed from plastic, as polyethylene or the like, and is preferably integrally formed, as by molding the parts in a well-known manner.

In using the apparatus of the present invention, one end of fishing line 11 is tied around body member 17 in notch 38, as best shown in Fig. 1. The other end of the fishing line is passed through aperture 24 and then weight 13 and fish hook 15 placed thereon in the usual manner. The portion of fishing line 11 that is between tab 23 and weight 13 is wound around body member 17, as best shown in Fig. 9. Fish hook 15 is then baited and the apparatus is ready to be tossed into the water for fishing. When the fishing apparatus is tossed into the water, weight 13 will cause float 16 to rotate about its longitudinal axis and permit the line to unwind from body member 17. After the line is unwound, the fishing apparatus will be in a disposition ready for catching fish, which disposition is shown in Fig. 10, wherein it will be seen float 16 is floating in a substantially horizontal disposition adjacent the surface of the water with fishing line 11 depending therefrom. Float 16, due to its light weight, will float high in the water, which will make it easier to see thereby minimizing the chance of the loss thereof. When a fish is caught, the pull of the fish on fishing line 11 will cause a downward pull on float 16 at tab 23, which will cause the float to tip into a substantially vertical or upright position, which position is shown in broken lines in Fig. 10. Thus, it will be understood the vertically disposed float 16 can be easily seen by the fisherman to indicate to him that a fish has been caught, whereby he may bring in his catch.

It will be understood that the length of fishing line 11 below float 16 will determine the fishing depth. In order to shorten the effective length of line 11, any suitable number of half hitches, as at 39, are placed in the line around float 17 in depressions 37. Two of such half hitches are shown in Fig. 10.

When it is desired to store the fishing apparatus of the present invention, fishing line 11 is wound around body member 17 from end to end thereof and it will be understood that ridges 35 and depressions 37 will cause the line to be spread apart so that it will dry easily.

A modified form of the float is shown in Figs. 3 and 4, which modified float is designated in general as float 40. As in the preferred form, the modified float 40 is substantially cylindrical in shape, but it is not of integral construction. Thus, the outer part of body member 41 of float 40 includes a net envelope 43 of substantially cylindrical configuration when extended. Opposite ends of envelope 43 are respectively joined to circular end members 45, 47 as by extending the loose ends of net envelope 43 through apertures 49 in end members 45, 47 and knotting or tying the loose ends. A flexible bag 51 formed of rubber or the like is disposed in envelope 43 between end members 45, 47. The neck 53 of bag 51 is extended through a hole 55 provided in end member 47 so that the neck will be in a disposition for inflating the bag. Bag 51 is inflated to extend envelope 43 and hold end members 45, 47 apart to provide an elongated substantially cylindrical body member. Neck 53 is tied off by suitable means, as a rubber band, a string, or the like, to keep bag 51 in an inflated disposition. It will be understood that the portion of bag 51 adjacent envelope 43 forms the inner part of body member 41.

Float 40 is used in the same manner for fishing as float 16 heretofore described. Thus, as best shown in Fig. 3, the end of fishing line 11 is tied around body member 41 adjacent the mid-portion thereof, the line extended through aperture 56 in a tab 57 attached to end member 45, and thence wound around body member 41 to place the device in readiness for fishing, as heretofore described.

It will be understood that flexible bag 51 may be deflated to provide compactness for the storage or the transporting thereof.

Another modified form of the float is shown in Figs. 5, 6, and 7 and is designated in general as float 59. As in the other described embodiments of the present invention, float 59 includes a substantially cylindrical body member 61 and spaced end members 63, 65 respectively fixedly attached adjacent opposite ends of the body member. Body member 61 is preferably formed of a flexible plastic envelope adapted to be extended in the position shown in Fig. 5 or collapsed as shown in Fig. 7. A valve 67 is provided in end member 65 for inflating and deflating body member 61. Valve 67 is preferably of the well-known type which is formed of rubber or the like and provided with a narrow bore 69 therethrough, which bore is kept in a normally closed disposition by the resiliency of the valve and is adapted to permit passage of a needle-like inflating head therethrough, as is commonly employed in pumps used to inflate footballs, basketballs, or the like.

End member 63 is preferably cup-shaped with the mouth 70 thereof opening into the interior of body member 61, whereby body member 61, when deflated, is adapted to be folded therein, as shown in Fig. 7, for storage or for the transporting thereof. End member 63 is formed with alternate ridges 71 and depressions 73 similar to the ridges and depressions of the preferred embodiment of the present invention, except that ridges 71 and depressions 73 are more closely spaced than ridges 35 and depressions 37. A tab 75 having an aperture 77 therethrough is fixedly mounted from end member 63 adjacent the outer end thereof and extends radially therefrom. End member 63 is preferably formed of a plastic, as polyethylene or the like, which is of rigid construction relative to body member 61 and is joined to the body member by commonly-known plastic weld methods.

Float 59 is used in the same manner for fishing as the other floats heretofore described. Thus, fishing line 11 is tied around float 59 in one of depressions 73 and the end of the fishing line extended through aperture 77 and thence wound around end member 63 in depressions 73 and over ridges 71.

Still another modified form of the float of the present invention is shown in Fig. 8 and designated, in general, as float 79. In a manner similar to the other embodiments, float 79 includes a substantially cylindrical body member 81 and spaced end members 83, 85 respectively attached adjacent opposite ends of body member 81.

The outer part of body member 81 includes a flexible envelope 87 formed of plastic or the like and which is substantially cylindrical in shape when in an expanded disposition, which expanded disposition is shown in Fig. 8. End member 83 includes a pair of discs 89 held together by suitable means, as brads 91 or the like, with the end of envelope 87 clamped therebetween to secure the envelope to the end member. The other end of envelope 87 is provided with a hem 83 through which a drawstring 95 is received. End member 85 is provided with an inner flange 97 adjacent one end of the end member, an outer flange 99 adjacent the other end of the end member, and a groove 101 therebetween. The end of envelope 87 with the drawstring 95 therein is placed over inner flange 97 and the drawstring tightened therearound to secure removably envelope 87 to end member 85. A flexible bag 103 formed of rubber or the like is disposed in the interior of envelope 87 between end members 83, 85. The neck 105 of flexible bag 103 extends outwardly through a bore 107 in end member 83 so that the neck is in position for inflating bag 103. After inflation of bag 103, neck 105 is secured by suitable means as a rubber band, string, or the like.

From the foregoing, it will be understood that flexible bag 103 holds envelope 87 in an extended disposition and holds end members 83, 85 apart, whereby forming float 79 into the substantially cylindrical disposition heretofore mentioned. It will further be understood that the walls of bag 103 adjacent envelope 87 form the inner part of body member 81.

Float 79 is used in a manner similar to the other forms of the float of the present invention heretofore described. Thus, fishing line 11 is tied around float 79 in groove 101 and the fishing line extended through the aperture 109 of a tab 111 fixedly mounted from outer flange 99 and extending radially outwardly therefrom. The fishing line is then wound around end member 85 in groove 101. The fishing apparatus is then used in a manner as heretofore described for fishing. It will be understood that float 79 may be placed in a compact disposition for storage or for the transporting thereof by deflating bag 103.

Although the invention has been described and illustrated with respect to a preferred embodiment thereof, it is to be understood that it is not to be so limited since changes and modifications may be made therein which are within the full intended scope of this invention as hereinafter claimed.

I claim:

1. Fishing apparatus comprising an elongated cylindrical float, said float being enclosed and hollow and being integrally formed of plastic whereby being adapted to float high in the water to be easily seen, said float including an irregularly formed outer surface to provide alternate ridges and depressions therein and to provide a notch adjacent the mid-portion thereof, a tab attached to said float adjacent one end thereof, said tab being provided with an aperture therethrough, fishing gear including a line having one end thereof tied around said float in said notch, said line extending through said aperture and being wound around said float over said ridges and depressions, a weight and a hook attached to said line adjacent the end thereof remote from said tied end whereby said apparatus is adapted to be tossed into the water so that said weight causes said line to unwind from said float for said hook to be disposed in position to catch a fish.

2. Fishing apparatus for fishing without the aid of a pole comprising an elongated cylindrical float, said float being enclosed and hollow whereby being adapted to float, said float including an irregularly formed outer surface to provide alternate ridges and depressions therein and to provide a notch adjacent the mid-portion thereof, a tab attached to said float adjacent one end thereof, said tab being provided with an aperture therethrough, fishing gear including a line having one end thereof tied around said float in said notch, said line extending through said aperture, a weight and a hook attached to said line adjacent the end thereof remote from said tied end whereby when said apparatus is disposed in water said hook hangs by said line from said float in a disposition for catching fish.

3. Fishing apparatus comprising a pair of substantially circular spaced end members, a hollow body member having a wall of substantially cylindrical configuration, said end members being respectively attached adjacent opposite ends of said body member to provide a light-weight float, air encased in said float to prevent the float from sinking when in water, a reinforcing partition attached to said wall in the interior of said body member and extending radially inwardly from the wall thereof to divide said body into two chambers, said partition being provided with a hole therethrough whereby said chambers are communicated with one another to equalize the pressure therein, a tab attached to one of said members adjacent the outer periphery thereof and extending radially therefrom, said tab being provided with an aperture therethrough, a fishing line having one end thereof fixedly secured to said body member adjacent said reinforcing partition, said line extending through said aperture and being wound around said body member, a weight and hook attached to said line adjacent the end thereof opposite from the secured end thereof whereby said apparatus is adapted to be tossed into the water so that said weight causes said line to unwind from said body member for said hook to be disposed in position to catch a fish, said line being unsecured other than on said body member whereby said fishing apparatus is free floating and adapted for fishing without the aid of a pole and the like.

References Cited in the file of this patent
UNITED STATES PATENTS

| | | |
|---|---|---|
| 779,937 | Holt | Jan. 10, 1905 |
| 849,367 | Burke | Apr. 9, 1907 |
| 1,230,335 | Shepherd | June 19, 1917 |
| 1,993,974 | McVicker | Mar. 12, 1935 |
| 2,519,427 | Besmer | Aug. 22, 1950 |
| 2,536,414 | Beard | Jan. 2, 1951 |
| 2,677,208 | Newton | May 4, 1954 |

FOREIGN PATENTS

| | | |
|---|---|---|
| 24,502 | Great Britain | 1908 |